United States Patent
Kaiya et al.

[11] Patent Number: 5,914,192
[45] Date of Patent: Jun. 22, 1999

[54] SILICONE RELEASE COATING COMPOSITIONS

[75] Inventors: Nobuo Kaiya; Taku Koyama, both of Ichihara; Atsushi Togashi, Chiba, all of Japan

[73] Assignee: Dow Corning Toray Silicone Co., Ltd., Tokyo, Japan

[21] Appl. No.: 08/976,700

[22] Filed: Nov. 24, 1997

[30] Foreign Application Priority Data

Nov. 27, 1996 [JP] Japan .................................. 8-331595

[51] Int. Cl.$^6$ .................................................. C08G 77/08
[52] U.S. Cl. ........................... 428/447; 528/15; 528/20; 525/478
[58] Field of Search .............................. 428/447; 528/15, 528/20; 525/478

[56] References Cited

U.S. PATENT DOCUMENTS

| | | | |
|---|---|---|---|
| 3,445,420 | 5/1969 | Kookoosedes et al. | 260/37 |
| 4,032,502 | 6/1977 | Lee et al. | 260/37 |
| 5,017,654 | 5/1991 | Togashi et al. | 525/100 |
| 5,708,046 | 1/1998 | Jones et al. | 522/99 |

FOREIGN PATENT DOCUMENTS

| | | |
|---|---|---|
| 61-261 | 1/1986 | Japan . |
| 64-51466 | 2/1989 | Japan . |
| 8-176448 | 7/1996 | Japan . |

*Primary Examiner*—Margaret W. Glass
*Attorney, Agent, or Firm*—Timothy J. Troy

[57] ABSTRACT

This invention relates to a silicone release coating composition comprising an organopolysiloxane having at least 2 alkenyl groups in each molecule, an organopolysiloxane having at least 3 silicon-bonded hydrogen atoms in each molecule, a carbon-carbon triple bond-functional alcohol having a boiling point at ambient pressure of at least 140° C., an organosilicon compound having at least 3 carbon-carbon triple bond-functional hydrocarbon groups bonded across oxygen to silicon, and a platinum catalyst. The silicone release coating compositions of this invention have excellent bath stability, form a very stable thin film on applicator rolls, cure rapidly even at relatively low temperatures, have stable curing characteristics during the course of bath aging, and exhibit stable release values during the course of bath aging.

19 Claims, No Drawings

1

SILICONE RELEASE COATING COMPOSITIONS

BACKGROUND OF THE INVENTION

This invention relates to silicone release coating compositions. More particularly, this invention relates to a silicone release coating composition that has excellent bath stability, that forms a very stable thin film on applicator rolls, that cures rapidly even at relatively low temperatures, that exhibits stable curing characteristics during the course of bath aging, and that also provides stable cured-film release values during the course of bath aging.

Organopolysiloxane compositions that cure by addition reaction to give release films are known. For example, Japanese Patent Application Laid Open No. 61-261 (261/1986) discloses a silicone release coating composition comprising an organopolysiloxane having at least 2 vinyl groups in each molecule, an organopolysiloxane having at least 2 silicon-bonded hydrogen atoms in each molecule, an organosilane compound containing 1 or 2 C≡C functional hydrocarbon groups bonded across oxygen to silicon, and a platinum compound. In Japanese Patent Application Laid Open No. 64-51466 (51,466/1989) is disclosed a silicone release coating composition comprising an organopolysiloxane having at least 2 vinyl groups in each molecule, an organopolysiloxane having at least 2 silicon-bonded hydrogen atoms in each molecule, an organopolysiloxane bearing at least 1 C≡C-functional hydrocarbon group bonded across oxygen to silicon, and a platinum compound. IN Japanese Patent Application Laid Open No. 8-176448 (176,448/1996) is disclosed a silicone release coating composition comprising an organopolysiloxane having at least 2 vinyl groups in each molecule, an organopolysiloxane having at least 2 silicon-bonded hydrogen atoms in each molecule, a C≡C-functional compound having a boiling point at ambient pressure of at least 150° C., a C≡C-functional compound having a boiling point at ambient pressure less than 150° C., and a platinum compound.

These silicone release coating compositions unfortunately suffer from a number of problems. They have unsatisfactory bath stability and unsatisfactory stability when formed into a thin film on an applicator roll. Moreover, improvements in these stabilities lead to an inability to cure the composition rapidly at relatively low temperatures. These silicone release coating compositions also suffer from such problems as a decline in curability during the course of bath aging and changes in the cured-film release values during the course of bath aging.

SUMMARY OF THE INVENTION

This invention relates to a silicon release coating composition comprising an organopolysiloxane having at least 2 alkenyl groups in each molecule, an organopolysiloxane having at least 3 silicon-bonded hydrogen atoms in each molecule, a carbon-carbon triple bond-functional alcohol having a boiling point at ambient pressure of at least 140° C., an organosilicon compound having at least 3 carbon-carbon triple bond-functional hydrocarbon groups bonded across oxygen to silicon, and a platinum catalyst.

It is an object of the present invention to provide a silicone release coating having excellent bath stability, forms a very stable thin film on applicator rolls, cures rapidly even at relatively low temperatures, exhibits stable curing characteristics during the course of bath aging, and provides stable cured-film release values during the course of bath aging.

DETAILED DESCRIPTION OF THE INVENTION

This invention relates to a silicone release coating composition comprising (A) 100 weight parts of an organopolysiloxane having at least 2 alkenyl groups in each molecule, (B) 1 to 20 weight parts of an organopolysiloxane having at least 3 silicon-bonded hydrogen atoms in each molecule, (C) 0.01 to 0.5 weight parts of a carbon-carbon triple bond-functional alcohol having a boiling point at ambient pressure of at least 140° C., (D) 0.0005 to 0.5 weight parts of an organosilicon compound having at least 3 carbon-carbon triple bond-functional hydrocarbon groups bonded across oxygen to silicon, and (E) a platinum catalyst in a quantity sufficient to provide from 1 to 1,000 weight-ppm platinum metal based on the total quantity of components (A), (B), (C), and (D).

The organopolysiloxane (A), which is the base ingredient of the present composition, must contain at least 2 alkenyl groups in each molecule. This alkenyl group is exemplified by vinyl, allyl, butenyl, pentenyl, and hexenyl, with vinyl and hexenyl being preferred. The alkenyl group can be bonded at the molecular chain terminals, in pendant position on the molecular chain, or at both positions. Bonding at the molecular chain terminals is preferred. The non-alkenyl silicon-bonded groups in (A) are exemplified by substituted and unsubstituted monovalent hydrocarbon groups exemplified by alkyl groups such as methyl, ethyl, and propyl, aryl groups such as phenyl and tolyl, aralkyl groups such as benzyl and phenethyl, and haloalkyl groups such as 3,3,3-trifluoropropyl. Methyl and phenyl are specifically preferred here. The molecular structure of (A) is exemplified by straight-chain, partially branched straight-chain, and branched-chain molecular structures with straight-chain structures being preferred. The viscosity of this component is preferably at least 40 mPa.s at 25° C. and preferably falls in the range from 40 to 5,000 mPa.s at 25° C. The organopolysiloxane (A) is specifically exemplified by trimethylsiloxy-endblocked dimethylsiloxane-methylvinylsiloxane copolymers, trimethylsiloxy-endblocked dimethylsiloxane-methylhexenylsiloxane copolymers, dimethylvinylsiloxy-endblocked dimethylpolysiloxanes, dimethylvinylsiloxy-endblocked dimethylsiloxane-methylvinylsiloxane copolymers, dimethylhexenylsiloxy-endblocked dimethylpolysiloxanes, and dimethylhexenylsiloxy-endblocked dimethylsiloxane-methylhexenylsiloxane copolymers.

The organopolysiloxane (B), which is the curing agent for the composition under consideration, must contain at least 3 silicon-bonded hydrogen atoms in each molecule. The hydrogen can be bonded at the molecular chain terminals, in pendant position on the molecular chain, or at both positions. The silicon-bonded groups in (B) other than hydrogen are exemplified by substituted and unsubstituted monovalent hydrocarbon groups as described above for component (A). Methyl and phenyl are specifically preferred here. The molecular structure of (B) is exemplified by straight-chain, partially branched straight-chain, branched-chain, and cyclic molecular structures. The viscosity of this component is preferably in the range from 1 to 1,000 mPa.s at 25° C. This particularly preferably falls in the range from 5 to 500 mPa.s at 25° C. and organopolysiloxane (B) is specifically exemplified by dimethylhydrogensiloxy-endblocked dimethylsiloxane-methylhydrogensiloxane copolymers, trimethylsiloxy-endblocked dimethylsiloxane-methylhydrogensiloxane copolymers, trimethylsiloxy-endblocked methylhydrogenopolysiloxanes, cyclic methylhydrogenpolysiloxanes, copolymers comprising $(CH_3)_2HSiO_{1/2}$ and $SiO_{4/2}$ units, and copolymers comprising $(CH_3)_3SiO_{1/2}$, $(CH_3)_2HSiO_{1/2}$, and $SiO_{4/2}$ units.

Components (B) is added to the compositions of this invention at from 1 to 20 weight parts and preferably at from 1 to 10 weight parts, in each case per 100 weight parts component (A). The composition containing component (B) at below this range per 100 weight parts (A) suffers from a slow rate of cured film formation. The cured film afforded by the composition containing (B) in excess of this range per 100 weight parts (A) exhibits impaired release characteristics.

The alcohol (C), which is one of the cure-rate controllers in the compositions of this invention, must contain a carbon-carbon triple bond and must have a boiling point at ambient pressure (bp) of at least 140° C. and preferably of at least 150° C. Alcohols containing a carbon-carbon triple bond but with a bp below 140° C. is associated with some or all of the problems of a reduced bath stability, reduced stability by the thin film on the applicator roll, declining curability during bath aging, and variations in the cured-film release value during bath aging. The alcohol (C) is exemplified by 3,5-dimethyl-1-hexyn-3-ol (bp=151° C.), 1-ethynylcyclohexanol (bp=180° C.), 3-phenyl-1-butyn-3-ol (bp=217° C.), and 2,5-dimethyl-3-hexyn-2,5-diol (bp=206° C.).

Component (C) is added to the compositions of this invention at from 0.01 to 0.5 weight parts, preferably at from 0.05 to 0.5 weight parts, and particularly preferably at from 0.1 to 0.4 weight parts, in each case per 100 weight parts component (A). The composition containing component (C) at below this range per 100 weight parts component (A) suffers from a progressively declining bath stability and from a progressive decline in the stability of the thin film on the applicator roll. The component containing component (C) in excess of this range per 100 weight parts (A) suffers from a progressive decline in curability at relatively low temperatures (80° C. to 120° C.).

The organosilicon component (D) is also a cure-rate controller for the composition under consideration. Its co-use with the alcohol (C) provides a solution to the various and in some cases conflicting problems by providing bath stability, imparting stability to the thin film on the applicator roll, inhibiting the decline in curability during the course of bath aging, preventing changes in the cured-film release values during the course of bath aging, and at the same time providing a rapid cure even at relatively low temperatures (80° C. to 120° C.). The characteristic feature of the organosilicon compound (D) is that it contains at least 3 C≡C functional hydrocarbon groups bonded across oxygen to silicon. Organosiloxane compounds containing 1 or 2 C≡C-functional hydrocarbon groups bonded across oxygen to silicon remain associated with some or all of the problems of reduced bath stability, reduced stability by the thin film on the applicator roll, declining curability during bath aging, and variations in the cured-film release value during bath aging. The organosilicon compound (D) is exemplified by methyltris((1,1-dimethyl-2-propynyl)oxy)silane with the following formula

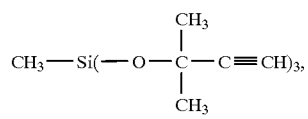

(bp > 200° C., boiling point at 3 mmHg = 91° C.)

methyltris((1-methyl-1-ethyl-2-propynyl)oxy)silane with the following formula

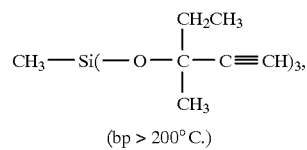

(bp > 200° C.)

ethyltris((1,1-dimethyl-2-propynyl)oxy)silane with the following formula

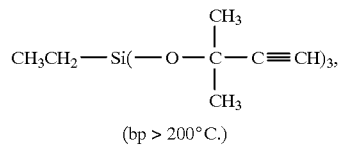

(bp > 200° C.)

methyltris((1-ethynylcyclohexyl)oxy)silane with the following formula

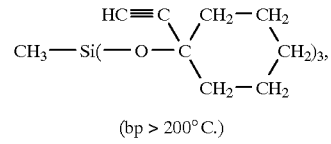

(bp > 200° C.)

1-trimethylsilyl-2-(tris((1,1-dimethyl-2-propynyl)oxy)silyl)ethane with the following formula

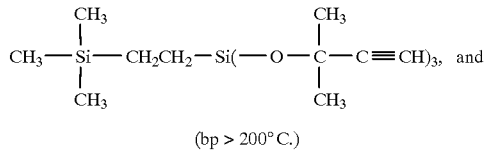

(bp > 200° C.)

1-(tris((1,1-dimethyl-2-propynyl)oxy)silyl)-2-(tris((1,1-dimethyl-2-propynyl)oxy)silyl)ethane with the following formula

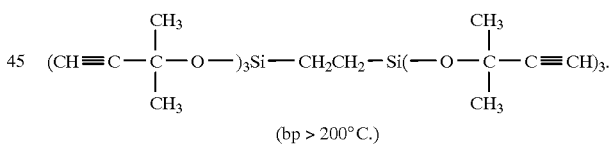

(bp > 200° C.)

Component (D) is added to the composition of this invention at from 0.0005 to 0.5 weight parts and preferably at from 0.01 to 0.1 weight parts, in each case per 100 weight parts component (A). As the addition of component (D) falls below this range per 100 weight parts component (A), the composition suffers from a progressively declining bath stability and a progressively declining stability in the thin film on the applicator roll. As the addition of component (D) exceeds this range per 100 weight parts component (A), the composition suffers from an increasing reduction in curability at relatively low temperatures (80° C. to 120° C.).

The platinum catalyst (E) is a curing catalyst for the instant composition and is exemplified by chloroplatinic acid, alcohol-modified chloroplatinic acid, platinum-olefin complexes, platinum-diketone complexes, platinum-alkenylsiloxane complexes, carbon powder supporting microparticulate platinum, silica micropowder supporting microparticulate platinum, and platinum black.

Component (E) is added to the instant compositions in a quantity that provides from 1 to 1,000 weight-ppm and preferably from 30 to 600 weight-ppm platinum metal in the catalyst based on the combined quantity of components (A) to (D). At component (E) additions that result in the amount of platinum metal from the catalyst declining below the specified weight range based on the combined quantity of components (A) to (D), the resulting composition will exhibit an increasingly poor curability at relatively low temperatures (80° C. to 120° C.). The bath stability and the stability of the thin film on the applicator roll progressively decline as this range is exceeded in the composition.

The compositions of this invention can be prepared by mixing the above-described components (A) to (E) to homogeneity. However, the following may be added to the instant composition on an optional basis: organic solvents such as aromatic hydrocarbons exemplified by toluene and xylene, and aliphatic hydrocarbons exemplified by heptane and hexane, controlled-release additives, thickeners, pigments, dyes, and so forth.

The compositions of this invention exhibit excellent bath stability, excellent stability by its thin film on the applicator roll, rapid cure at relatively low temperatures of 80° C. to 120° C., stable curability during the course of bath aging, and stable cured-film release values during the course of bath aging. These features make this composition well suited for the production of paper and films that exhibit releasability from pressure-sensitive adhesives and other tacky or sticky materials. In consequence thereof the instant composition can be applied to paper, polyethylene-laminated paper, plastic films, woven fabrics, and nonwoven fabrics. The compositions of this invention can be applied neat to the surface of the particular substrate as listed above, or it can be diluted with organic solvent prior to its application. After its application onto the substrate surface, the composition can be rapidly cured to give the cured film or coating by heating the coated substrate at 50° C. to 200° C. and preferably at 80° C. to 120° C.

EXAMPLES

The compositions of this invention will be explained in greater detail below using working examples. The values reported for the viscosity were measured at 25° C. The following methods were used to measure the bath stability, curability as a function of bath aging, and releasability as a function of bath aging on the cured silicone release coating compositions.

Bath stability: 100 g of the silicone release coating composition was placed in a 450-ml glass bottle and stirred at 400 rpm at 40° C. The time until gelation was measured in order to evaluate bath stability.

Curability as a function of bath aging: Immediately after its preparation, the silicon release coating composition was applied at about 1.0 g/m² onto polyethylene-laminated paper and was then heated in a forced-convection oven at 90° C. for 30 seconds. The cured film was subsequently rubbed with a finger, the curability of the composition was scored with a "+" when no delamination or dulling occurred, while a score of "x" was rendered when dullying occurred. Immediately after its preparation the silicone release coating composition was also stirred at 400 rpm for 2 hours at 40° C., and the preceding curability test was also similarly executed on this aged composition.

Releasability of the cured film as a function of bath aging: Immediately after its preparation the silicone release coating composition was coated at about 1.0 g/m² on polyethylene-laminated paper and was then heated in a forced-convection oven for 30 seconds at 110° C. to give a cured release film. A solvent-based acrylic-type pressure-sensitive adhesive (Oribine BPS-5127 from Toyo Ink Mfg. Co., Ltd.) was applied on the surface of the cured film and was heated at 70° C. for 2 minutes. 25 μm-thick polyester film (Lumilar S-10 from Toray Inc.) was then applied onto the pressure-sensitive adhesive. After the assembly had been aged for 1 day at 25° C. under a load of 20 gf/cm², a test specimen was prepared by cutting to a width of 5 cm. Using a tensile tester, the release resistance (gf/5 cm) was measured when the polyester film was peeled at 180° at a peel rate of 0.3 m/minute. The release force was also measured as described above on the silicone release coating composition, which immediately after its preparation was stirred at 400 rpm for 2 hours at 40° C.

Example 1

A mixture was prepared from the following: 100 weight parts of a dimethylvinylsiloxy-endblocked dimethylpolysiloxane having a viscosity of 400 mPa.s at 25° C., 3 weight parts of a trimethylsiloxy-endblocked dimethylsiloxane-methylhydrogensiloxane copolymer having a viscosity of 100 mPa.s at 25° C. and a dimethylsiloxane unit:methylhydrogensiloxane unit molar ratio of 3:7, 0.3 weight parts of 3-phenyl-1-butyn-3-ol (bp=217° C.), and 0.05 weight parts of methyltris((1,1-dimethyl-2-propynyl)oxy)silane having the formula:

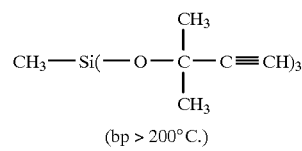

(bp > 200° C.)

A silicone release coating composition(A) was then prepared by the adding to the mixture a platinum/1,1,3,3-tetramethyl-1,3-divinyldisoloxane complex in a quantity sufficient to provide 250 weight-ppm platinum metal based on the mixture. The bath stability, curability as a function of bath aging, and cured film releasability as a function of bath aging were measured as described above on composition (A), and the results are reported in Table 1.

Comparative Example 1

A silicone release coating composition (B) was prepared as in Example 1, but in this case changing the addition of the 3-phenyl-1-butyn-3-ol to 0.4 weight parts and omitting the methyltris((1,1-dimethyl-2-propynyl)oxy)silane used in Example 1. The bath stability, curability as a function of bath aging, and cured film releasability as a function of bath aging were measured as described above on composition (B), and the results are reported in Table 1.

Comparative Example 2

A cured release film-forming organopolysiloxane composition (C) was prepared as in Example 1, but in this case adding 0.05 weight parts of methyltris((1,1-dimethyl-2-propynyl)oxy)silane while omitting the 3-phenyl-1-butyn-3-ol used in Example 1. The bath stability, curability as a function of bath aging, and cured film releasability as a function of bath aging were measured as described above on composition (C), and the results are reported in Table 1.

Comparative Example 3

A silicone release coating composition (D) was prepared as in Example 1, but in this case adding 0.3 weight parts of methyltris((1,1-dimethyl-2-propynyl)oxy)silane while omitting the 3-phenyl-1-butyn-3-ol used in Example 1. The bath stability, curability as a function of bath aging, and cured film releasability as a function of bath aging were measured as described above on composition (D), and the results are reported in Table 1.

TABLE 1

|  | This invention | comparative examples | | |
|---|---|---|---|---|
|  | Example 1 | Comparative Example 1 | Comparative Example 2 | Comparative Example 3 |
| composition | A | B | C | D |
| bath stability (hours) | 5.00 | 1.75 | 0.25 | 5.50 |
| curability |  |  |  |  |
| immediately after bath preparation | + | + | + | x |
| after bath aging for 2 hours | + | could not be measured due to gelation | could not be measured due to gelation | x |
| releasability |  |  |  |  |
| release resistance in gf/5 cm |  |  |  |  |
| immediately after bath preparation | 23 | 22 | 25 | could not be measured (did not cure) |
| after bath aging for 2 hours | 24 | could not be measured | could not be measured | could not be measured (did not cure) |

Example 2

A mixture was prepared from the following: 100 weight parts of a dimethylhexenylsiloxy-endblocked dimethylsiloxane-methylhexenylsiloxane copolymer having a viscosity of 200 mPa.s at 25° C. and a hexenyl group content of 4.0 mole %, 4 weight parts of a trimethylsiloxy-endblocked methylhydrogenpolysiloxane having a viscosity of 20 mPa.s at 25° C., 0.15 weight parts of 1-ethynylcyclohexanole (bp=180° C.), and 0.01 weight parts of methyltris((1,1-dimethyl-2-propynyl)oxy)silane. A silicone release coating composition (E) was then prepared by adding to the above mixture a platinum/1,1,3,3-tetramethyl-1,3-divinyldisiloxane complex in a quantity sufficient to provide 100 weight-ppm platinum metal based on the mixture. The bath stability, curability as a function of bath aging, and cured film releasability as a function of bath aging were measured on composition (E), and the results are reported in Table 2.

Example 3

A silicone release coating composition (F) was prepared as in Example 2, but in this case using 0.25 weight parts of 1-ethynylcyclohexanol and 0.005 weight parts of methyltris ((1,1-dimethyl-2-propynyl)oxy)silane in the procedure in Example 2. The bath stability, curability as a function of bath aging, and cured film releasability as a function of bath aging were measured on composition (F), and the results are reported in Table 2.

Comparative Example 4

A silicone release coating composition (G) was prepared as in Example 2, but in this case adding 0.20 weight parts of 1-ethynylcyclohexanol in the procedure of Example 2 and adding 1.0 weight parts of trimethyl((1,1-dimethyl-2-propynyl)oxy)silane (bp=115° C.) having the formula

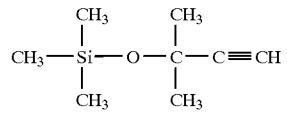

in place of the methyltris((1,1-dimethyl-2-propynyl)oxy) silane. The bath stability, curability as a function of bath aging, and cured film releasability as a function of bath aging were measured on composition (G), and the results are reported in Table 2.

Comparative Example 5

A silicone release coating composition (H) was prepared as in Example 2, but in this case adding 0.02 weight parts of 1-ethynylcyclohexanol in the procedure of Example 2 and adding 0.1 weight parts of methylvinylbis((1,1-dimethyl-2-propynyl)oxy)silane (bp>200° C.) having the formula

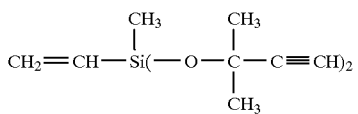

in place of the methyltris((1,1-dimethyl-2-propynyl)oxy) silane. The bath stability, curability as a function of bath aging, and cured film releasability as a function of bath aging were measured on composition (H), and the results are reported in Table 2.

Comparative Example 6

A silicone release coating composition (I) was prepared as in Example 2, but in this case using 0.25 weight parts of 3-methyl-1-butyn-3-ol (bp=104° C.) in place of the 1-ethynylcyclohexanol used in Example 2. The bath stability, curability as a function of bath aging, and cured film releasability as a function of bath aging were measured on composition (I), and the results are reported in Table 2.

TABLE 2

|  | This invention | | comparative examples | | |
|---|---|---|---|---|---|
|  |  | Comparative | Comparative | Comparative |  |
|  | Example 2 | Example 3 | Example 4 | Example 5 | Example 6 |
| composition | E | F | G | H | I |
| bath stability (hours) | 5.00 | 4.50 | 2.25 | 4.00 | 3.00 |
| curability |  |  |  |  |  |
| immediately after bath preparation | + | + | + | + | + |
| after bath aging for 2 hours | + | + | x | x | x |
| releasability |  |  |  |  |  |
| release resistance in gf/5 cm |  |  |  |  |  |
| immediately after bath preparation | 20 | 18 | 20 | 35 | 19 |
| after bath aging for 2 hours | 22 | 20 | 56 | 45 | 35 |

That which is claimed is:

1. A silicon release coating composition comprising:
   (A) 100 weight parts of an organopolysiloxane having at least 2 alkenyl groups in each molecule;
   (B) 1 to 20 weight parts of an organopolysiloxane having at least 3 silicon-bonded hydrogen atoms in each molecule;
   (C) 0.01 to 0.5 weight parts of a carbon-carbon triple bond-functional alcohol having a boiling point at ambient pressure of at least 140° C.;
   (D) 0.0005 to 0.5 weight parts of an organosiloxane compound having at least 3 carbon-carbon triple bond-functional hydrocarbon groups bonded to silicon through an oxygen atom; and
   (E) a platinum catalyst in a quantity sufficient to provide from 1 to 1,000 weight-ppm platinum metal based on the total quantity of components (A), (B), (C), and (D).

2. A composition according to claim 1, wherein (A) is selected from the group consisting of trimethylsiloxy-endblocked dimethylsiloxane-methylvinylsiloxane copolymers, trimethylsiloxy-endblocked dimethylsiloxane-methylhexenylsiloxane copolymers, dimethylvinylsiloxy-endblocked dimethylpolysiloxanes, dimethylvinylsiloxy-endblocked dimethylsiloxane-methylvinylsiloxane copolymers, dimethylhexenylsiloxy-endblocked dimethylpolysiloxanes, and dimethylhexenylsiloxy-endblocked dimethylsiloxane-methylhexenylsiloxane copolymers.

3. A composition according to claim 1, wherein (B) is selected from the group consisting of dimethylhydrogensiloxy-endblocked dimethylsiloxane-methylhydrogensiloxane copolymers, trimethylsiloxy-endblocked dimethylsiloxane-methylhydrogensiloxane copolymers, trimethylsiloxy-endblocked methylhydrogenpolysiloxanes, cyclic methylhydrogenpolysiloxanes, copolymers comprising $(CH_3)_2HSiO_{1/2}$ and $SiO_{4/2}$ units, and copolymers comprising $(CH_3)_3SiO_{1/2}$, and $SiO_{4/2}$ units.

4. A composition according to claim 1, wherein (C) is selected from the group consisting of 3,5-dimethyl-1-hexyn-3-ol, 1-ethynylcyclohexanol, 3-phenyl-1-butyn-3-ol, and 2,5-dimethyl-3-hexyn-2,5-diol.

5. A composition according to claim 1, wherein (D) is selected from the group consisting of

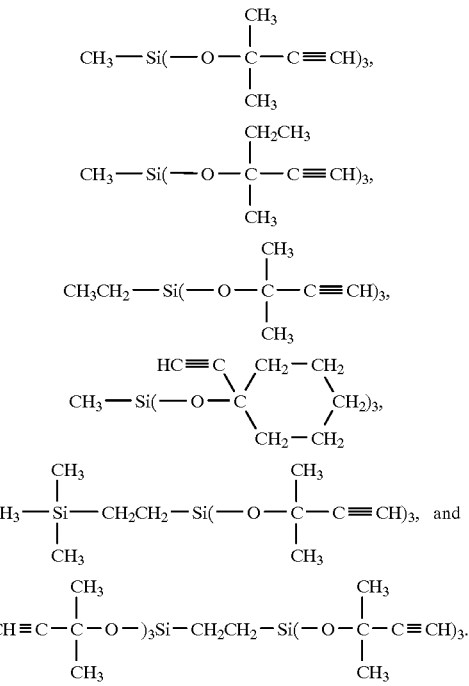

6. A composition according to claim 1, wherein (E) is selected from the group consisting of chloroplatinic acid, alcohol-modified chloroplatinic acid, platinum-olefin complexes, platinum-diketone complexes, platinum-alkenylsiloxane complexes, carbon powder supporting microparticulate platinum, silica micropowder supporting microparticulate platinum, and platinum black.

7. A silicon release coating composition obtained by a method comprising:

(I) mixing:
(A) 100 weight parts of an organopolysiloxane having at least 2 alkenyl groups in each molecule;
(B) 1 to 20 weight parts of an organopolysiloxane having at least 3 silicon-bonded hydrogen atoms in each molecule;
(C) 0.01 to 0.5 weight parts of a carbon-carbon triple bond-functional alcohol having a boiling point at ambient pressure of at least 140° C.
(D) 0.0005 to 0.5 weight parts of an organosilicon compound having at least 3 carbon-carbon triple bond-functional hydrocarbon groups bonded to silicon through an oxygen atom; and
(E) a platinum catalyst in a quantity sufficient to provide from 1 to 1,000 weight-ppm platinum metal based on the total quantity of components (A), (B), (C), and (D).

8. A composition according to claim 7, wherein (A) is selected from the group consisting of trimethylsiloxy-endblocked dimethylsiloxane-methylvinylsiloxane copolymers, trimethylsiloxy-endblocked dimethylsiloxane-methylhexenylsiloxane copolymers, dimethylvinylsiloxy-endblocked dimethylpolysiloxanes, dimethylvinylsiloxy-endblocked dimethylsiloxane-methylvinylsiloxane copolymers, dimethylhexenylsiloxy-endblocked dimethylpolysiloxanes, and dimethylhexenylsiloxy-endblocked dimethylsiloxane-methylhexenylsiloxane copolymers.

9. A composition according to claim 7, wherein (B) is selected from the group consisting of dimethylhydrogensiloxy-endblocked dimethylsiloxane-methylhydrogensiloxane copolymers, trimethylsiloxy-endblocked dimethylsiloxane-methylhydrogensiloxane copolymers, trimethylsiloxy-endblocked methylhydrogenpolysiloxanes, cyclic methylhydrogenpolysiloxanes, copolymers comprising $(CH_3)_2HSiO_{1/2}$ and $SiO_{4/2}$ units, and copolymers comprising $(CH_3)_3SiO_{1/2}$, $(CH_3)_2HSiO_{1/2}$, and $SiO_{4/2}$ units.

10. A composition according to claim 7, wherein (C) is selected from the group consisting of 3,5-dimethyl-1-hexyn-3-ol, 1-ethynylcyclohexanol, 3-phenyl-1-butyn-3-ol, and 2,5-dimethyl-3-hexyn-2,5-diol.

11. A composition according to claim 7, wherein (D) is selected from the group consisting of

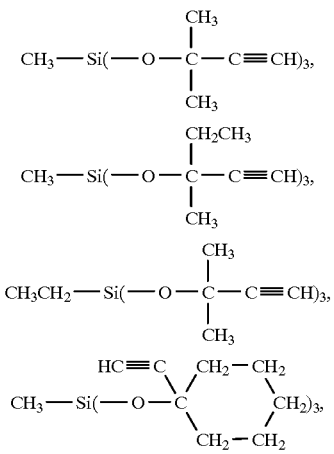

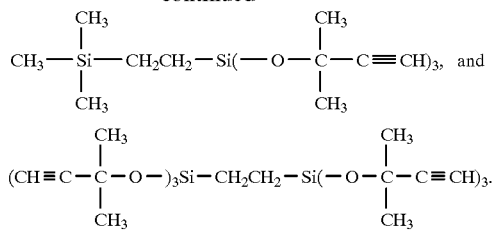

12. A composition according to claim 7, wherein (E) is selected from the group consisting of chloroplatinic acid, alcohol-modified chloroplatinic acid, platinum-olefin complexes, platinum-diketone complexes, platinum-alkenylsiloxane complexes, carbon powder supporting microparticulate platinum, silica micropowder supporting microparticulate platinum, and platinum black.

13. A treated substrate obtained by a method comprising:
(I) applying a silicone release coating composition to the surface of a substrate wherein the silicone release coating composition comprises:
(A) 100 weight parts of an organopolysiloxane having at least 2 alkenyl groups in each molecule;
(B) 1 to 20 weight parts of an organopolysiloxane having at least 3 silicon-bonded hydrogen atoms in each molecule;
(C) 0.01 to 0.5 weight parts of a carbon-carbon triple bond-functional alcohol having a boiling point at ambient pressure of at least 140° C.;
(D) 0.0005 to 0.5 weight parts of an organosilicon compound having at least 3 carbon-carbon triple bond-functional hydrocarbon groups bonded to silicon through an oxygen atom; and
(E) a platinum catalyst in a quantity sufficient to provide from 1 to 1,000 weight-ppm platinum metal based on the total quantity of components (A), (B), (C), and (D); and
(II) exposing the coating and the substrate to heat in an amount sufficient to cure the coating.

14. A treated substrate according to claim 13, wherein the method further comprises (III) adding a pressure sensitive adhesive to the substrate after step (II).

15. A treated substrate according to claim 13, wherein (A) is selected from the group consisting of trimethylsiloxy-endblocked dimethylsiloxane-methylvinylsiloxane copolymers, trimethylsiloxy-endblocked dimethylsiloxane-methylhexenylsiloxane copolymers, dimethylvinylsiloxy-endblocked dimethylpolysiloxanes, dimethylvinylsiloxy-endblocked dimethylsiloxane-methylvinylsiloxane copolymers, dimethylhexenylsiloxy-endblocked dimethylpolysiloxanes, and dimethylhexenylsiloxy-endblocked dimethylsiloxane-methylhexenylsiloxane copolymers.

16. A treated substrate according to claim 13, wherein (B) is selected from the groups consisting of dimethylhydrogensiloxy-endblocked dimethylsiloxane-methylhydrogensiloxane copolymers, trimethylsiloxy-endblocked dimethylsiloxane-methylhydrogensiloxane copolymers, trimethylsiloxy-endblocked methylhydrogenopolysiloxanes, cyclic methylhydrogenpolysiloxanes, copolymers comprising $(CH_3)_2HSiO_{1/2}$ and $SiO_{4/2}$ units, and copolymers comprising $(CH_3)_3SiO_{1/2}$, $(CH_3)_2HSiO_{1/2}$, and $SiO_{4/2}$ units.

17. A treated substrate according to claim 13, wherein (C) is selected from the group consisting of 3,5-dimethyl-1- hexyn-3-ol, 1-ethynylcyclohexanol, 3-phenyl-1-butyn-3-ol, and 2,5-dimethyl-3-hexyn-2,5-diol.

18. A treated substrate according to claim 13, wherein (D) is selected from the group consisting of

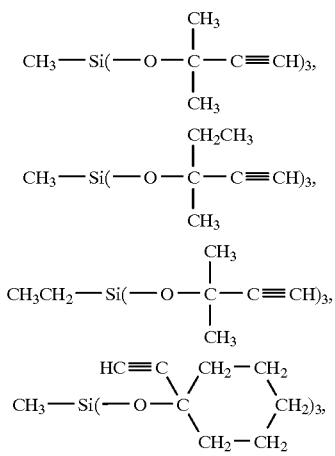

-continued

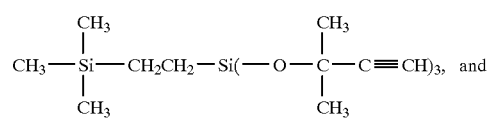

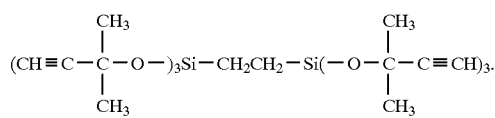

19. A treated substrate according to claim 13, wherein (E) is selected from the group consisting of chloroplatinic acid, alcohol-modified chloroplatinic acid, platinum-olefin complexes, platinum-diketone complexes, platinum-alkenylsiloxane complexes, carbon powder supporting microparticulate platinum, silica micropowder supporting microparticulate platinum, and platinum black.

* * * * *